United States Patent Office 2,831,763
Patented Apr. 22, 1958

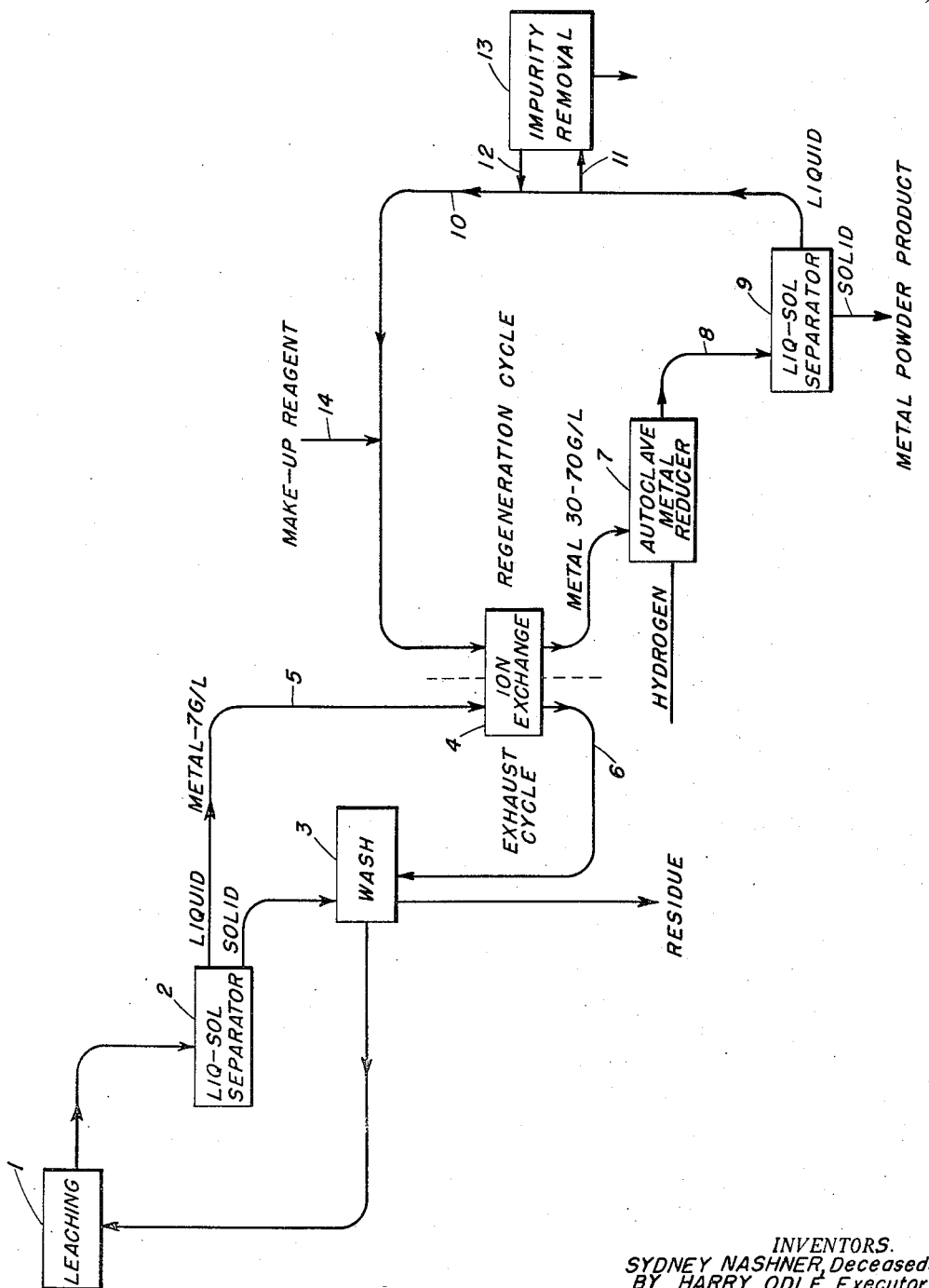

2,831,763

METHOD OF RECOVERING METAL BY USING ION EXCHANGE AND AUTOCLAVE REDUCTION

Sydney Nashner, deceased, late of Saskatchewan, Alberta, Canada, by Harry Odle, executor, Summit, N. J., and John Dasher, Pittsburgh, Pa., assignors to Chemical Construction Corporation, New York, N. Y., a corporation of Delaware Application July 17, 1956, Serial No. 598,432

2 Claims. (Cl. 75—117)

This invention relates broadly to a method for the recovery of metals from dilute aqueous solutions thereof by a combination of ion exchange and autoclave reduction in the presence of hydrogen, carbon monoxide or other reducing gases. The process of the invention is particularly well adapted for the treatment of dilute metal solutions obtained by leaching low-grade metal ores with acids, but in its broader aspects is not limited thereto.

Within recent years an important advance in the recovery of metals such as copper from their solutions has been based on autoclave reduction processes, wherein aqueous solutions of the salts of these metals are heated with reducing gases to precipitate the metal in finely divided condition. These autoclave processes are quite efficient insofar as completeness of the metal precipitation is concerned. However, since they involve a large capital expenditure for the necessary autoclaves and other pressure resistant equipment, their economic efficiency is impaired if solutions to be treated are too dilute in dissolved metal.

Accordingly, a principal object of the present invention is the provision of a method suitable for preconcentrating available metal solutions to be treated used in these autoclave processes so that the equipment may be operated at greater economic efficiency. A further object is the provision of a method wherein the inorganic acid produced as a by-product in the autoclave process is used to advantage in preconcentrating the metal solutions. Still further objects will be apparent from the following description of preferred embodiments of the invention when taken with the examples and the appended claims.

In the present invention the objects are attained by pretreating relatively dilute aqueous solutions of metals adapted for recovery by the autoclave reduction process by depositing the metal from the solution on an ion exchange body followed by eluting the ion exchange body with an eluent obtained as by-product acid from the autoclave reduction process. By this procedure metal solutions of relatively high concentration are obtained as feed for the autoclave reduction process without the necessity of using preconcentrators and with useful employment of by-product acid from the reduction autoclave that in many cases would otherwise be thrown away.

It will be evident that the principles of the invention can be applied to solutions of any metal capable of forming water-soluble compounds from which a metal, a metal oxide or complex thereof can be deposited on an ion exchange body. When the metal is in solution as its sulfate, nitrate, chloride or other simple salt, as is most frequently the case, a hydrogen exchange body such as one of the commercially available cation-exchange resins may be employed. When the desired metal is in solution as a complex, such as the ammonia complexes obtained by leaching nickel and cobalt ores with ammonia or ammoniacal ammonium sulfate solutions, an anion exchange resin may be used. When several metals are present in the leach liquors, as is frequently the case with complex ores, several different ion exchange bodies each having the characteristics necessary for the collection of a particular type of metal may be used in sequence.

The invention will be more fully described with reference to the accompanying drawing wherein the single figure is a flow sheet of a typical embodiment thereof. On the drawing reference numeral 1 indicates a leaching step, which is preferably carried out by agitating a suspension of finely-divided, metal-bearing solids such as an ore with a leaching agent such as sulfuric acid. Reference numeral 2 indicates a separation step wherein the pregnant metal solution from the leaching step is separated from the residual solids, the latter being washed in washing step 3 with barren solution from the ion exchange columns 4, as will subsequently be described. Liquor from the washings is returned to and used in the leaching step.

It is a characteristic of the majority of leaching processes of the type under consideration that the leach solutions are relatively dilute and require concentration before recovery of the metal values therefrom. In accordance with a feature of the present invention, dilute leach solution is passed in contact with one or more beds of ion exchange body to deposit the metal from solution on the ion exchanger. As has been indicated above, the particular type of ion exchanger to be used will depend on the type of metal compound in the leach solution; when it is present as a simple inorganic salt a hydrogen exchange resin such as a sulfonated carbonaceous material, a sulfonated copolymer of styrene and divinylbenzene or the like is preferably used.

On the drawing the ion exchanger is indicated by reference numeral 4 and the inlet line thereto as 5, the exhaust line 6 for the barren solution leading to the washing step 3, as indicated above. Usually the ion exchanger will consist of a number of beds or columns wherein two or more are operated in series while in one or more of the others the ion exchanger is simultaneously being regenerated by the passage of an eluant therethrough.

In accordance with a principal feature of the present invention, the eluant used for recovery of the deposited metal from the ion exchange resin is a by-product acid from the autoclave metal reducer 7. This autoclave operates on the principle of heating with hydrogen, carbon monoxide or other reducing gas a solution of a metal salt capable of precipitating the metal therefrom by reaction with hydrogen which, in effect, replaces the metal in the compound containing it. For example a copper sulfate solution, upon heating with hydrogen, deposits metallic copper and forms an equivalent amount of sulfuric acid. The reaction is usually carried out at relatively high temperatures on the order of 350°–450° F. and at the correspondingly high pressures necessary to maintain liquid conditions in the autoclave, and when it is completed the autoclave contents are preferably discharged through a line 8 to a separator 9 wherein the metal product is separated from the acid solution. In accordance with the present invention this acid solution is recycled through line 10 to those beds of the ion exchanger 4 that are undergoing regeneration, and is used to remove additional quantities of the metal from the ion exchange body.

During continuous or prolonged operation of the ion exchanger with one or more autoclave reducers and continuous recycling of the by-product acid from the autoclaves to the ion exchange beds there is a tendency to build up impurities in the recycled acid. In order to maintain this acid in a purified condition a side stream is intermittently or continuously withdrawn through a line 11 and treated to remove the impurities, after which the purified acid is returned to the cycle through line 12.

The impurity removal, which is designated by reference numeral 13, is preferably carried out by concentrating the acid to the point where salts and other impurities are insoluble therein, as by passing hot combustion gases through it, followed by filtration. Any additional acid that may be necessary to make up losses in the recycled eluant may be added through line 14.

From the foregoing description of a typical embodiment of the invention it will be seen that its essential features are the deposition of metal from a dilute aqueous solution on a suitable ion exchange body, the formation of a more concentrated solution of the metal by eluting the ion exchange body with a more concentrated solution of eluant, precipitation of metal values from the concentrated solution by heating it with a reducing gas with simultaneous regeneration of the eluant, and recycling of the regenerated eluant to the ion exchange body. This combination of features can be applied directly to leach solutions containing any metal capable of precipitation with hydrogen in the reducing autoclave 7 with regeneration of the eluant used in removing it from the ion exchange body; it can also be applied to other metals by first replacing these metals in solution with a metal that is higher in the electromotive displacement series and is capable of precipitation with hydrogen. Thus, for example, the iron in ferric sulfate solutions can be replaced with copper which is precipitated with hydrogen in the autoclave 7 with the formation of an equivalent quantity of sulfuric acid. It will be seen, therefore, that the principles of the invention are applicable to a wide variety of metals.

The principles of the invention are likewise not dependent on the use of any particular acid as the leaching agent, and in fact the acid used for eluting the ion exchange body may be different from the reagent used to dissolve the metal from the ore. Thus, with reference to the drawing, it will be evident that a relatively cheap acid such as sulfuric acid could be used in the leaching cycle indicated by reference numerals 1–5, whereas a more expensive acid such as hydrochloric acid could be employed in the regeneration cycle. These and other modifications within the scope of the invention will readily be suggested by the foregoing description when taken with the following examples, and are included within the spirit and scope of the appended claims.

The invention will be further described by the following examples to which, however, it is not limited.

*Example 1*

A malachite ore containing 0.8% copper is leached at 50% solids with 50 lbs. per ton of aqueous sulfuric acid containing 25 grams of $H_2SO_4$ per liter. An 88% extraction is obtained and the leach solution will assay 7 grams per liter of copper when the subsequently described washing procedure is used.

The copper is recovered from the leach solution by depositing it on a cation exchange resin. A sulfonated polymerizate of styrene and divinylbenzene in the form of small beads or granules, sold commercially as "Amberlite IR 120," is used for this purpose. By operating two columns of this resin in series a loading of 50–70 grams of copper per liter is obtained in the first column; when this becomes saturated it is by-passed and a column of freshly regenerated resin is put into operation behind the second column. This permits a continuous operation in which two columns are used for copper recovery while the third is being regenerated. The barren solution from the second column is returned to wash the leached ore residue, and the wash solution is used to pulp up fresh copper ore. The barren solution contains 11 grams per liter of sulfuric acid which is about 45% of the acid needed for leaching.

The column of saturated cation-exchange resin is regenerated by elution with a 15%–30% aqueous sulfuric acid solution. Tests with "Amberlite IR 120" have shown that by passing a downflow of 15% sulfuric acid through the copper-saturated resin a maximum concentration of 34.6 grams of copper per liter are obtained in the eluate. With another sulfonated polystyrene resin sold as "Permutit Q" and previously saturated with copper a maximum concentration of 77.6 grams of copper per liter of eluate is obtained with 30% sulfuric acid. When the acid strength is reduced to 20% $H_2SO_4$ a maximum concentration of 68.2 grams of copper per liter is obtained. It is evident, therefore, that much more highly concentrated copper sulfate solutions are obtained from the cation exchangers as compared with the copper content of the leach liquors passed through these resins.

The eluate from the cation exchangers is charged into an autoclave and heated to 350° F. and hydrogen, carbon monoxide or a mixture of these gases is introduced to precipitate the copper as metal and leave a 15%–30% sulfuric acid solution for recycle to the ion exchangers. A small amount of finely divided copper may be added to the autoclave charge before the reaction to facilitate the formation of a granular copper product. When the reduction has been completed to the desired extent the solution in the autoclave is flashed and the flashed steam is separated from the acid and used to preheat the autoclave feed to 212° F., or the autoclave contents may be passed in indirect heat exchange with the feed to attain the same result.

*Example 2*

A silver ore from Pachuca, Mexico, containing 8 ounces of silver per ton is leached at 40% solids with 15 lbs. per ton of nitric acid containing 18 grams, of $HNO_3$ per liter and the leach solution is passed through the ion exchange columns described in Example 1 with return of the barren solution from the second column to wash the leached ore residue. With columns of "Amberlite IR 120" a loading of 30–40 grams of silver per liter is obtained in the first column and upon regeneration with 8–10% nitric acid an eluate containing 20 grams per liter of silver is obtained. This is reduced with hydrogen under pressure to deposit the silver as metal and the resulting regenerated aqueous nitric acid is returned to the ion exchange column.

By the same procedure metallic antimony is obtained from dilute antimony chloride solutions resulting from the leaching of antimony sulfide ores with hydrochloric acid. Arsenic and bismuth are chemically similar to antimony and can be recovered by hydrochloric acid leaching, deposition on the ion exchange column and reduction of their hydrochloric acid eluates with hydrogen or carbon monoxide.

What we claim is:

1. In recovering a metal value by leaching metal-value bearing solids with a dilute aqueous leach solution of a solubilizing reagent for the metal value and treating resultant leach solution containing dissolved metal value in a reduction operation with a reducing gas at elevated temperatures and superatmospheric pressures, whereby said metal value is precipitated; the improvement which comprises depositing dissolved metal value from the leach solution on an ion exchange body; recycling resultant solution to said leaching step; eluting said ion exchange body with an aqueous eluant solution more concentrated in solubilizing reagent than said leach solution, thereby forming a concentrated solution of said metal value; subjecting resultant concentrated solution to said reduction operation with reducing gas, thereby precipitating dissolved metal value therefrom and regenerating said concentrated eluant solution; removing resultant precipitate and recycling resultant regenerated eluant to said ion exchange body.

2. In recovering metallic copper by leaching copper-bearing solids with dilute aqueous sulfuric acid, and treating resultant leach solution containing dissolved copper with a non-sulfide reducing gas at elevated temperatures and superatmospheric pressures, whereby copper metal powder is precipitated; the improvement which comprises depositing dissolved copper from said leach solution on a cation exchange body; recycling resultant solution to said leaching step; eluting said cation exchange body with an aqueous sulfuric acid eluant solution more concentrated in sulfuric acid than said leach solution, thereby forming a concentrated copper sulfate solution; subjecting said concentrated solution to said reduction operation with a non-sulfide reducing gas, thereby precipitating metallic copper powder and regenerating said aqueous sulfuric acid eluant solution; removing resultant precipitate and recycling resultant regenerated eluant to said cation exchange body.

References Cited in the file of this patent

UNITED STATES PATENTS

| | | |
|---|---|---|
| 2,628,165 | Bliss | Feb. 10, 1953 |
| 2,753,257 | Nashner et al. | July 3, 1956 |

OTHER REFERENCES

"Ion Exchange" (Nachod), Academic Press Inc. (New York), 1949 (pages 17–20 relied on. Copy in Class. Div. V and in Sci. Lib.)